Feb. 28, 1967 R. W. JOHNSON 3,306,838
APPARATUS FOR ELECTRICAL STOCK REMOVAL
Filed Dec. 11, 1963

INVENTOR.
Roger W. Johnson
BY
Hugh L. Fisher
ATTORNEY

United States Patent Office 3,306,838
Patented Feb. 28, 1967

3,306,838
APPARATUS FOR ELECTRICAL STOCK REMOVAL
Roger W. Johnson, Rochester, Mich., assignor to General Motors Corporation, Detroit, Mich., a corporation of Delaware
Filed Dec. 11, 1963, Ser. No. 329,691
9 Claims. (Cl. 204—224)

This invention relates to improved apparatus for electrical stock removal; and further relates to an improved cutting tool electrode for generating arcuate surfaces in a workpiece.

Frequently, the need arises for generating curved holes in workpieces, particularly workpieces of extremely hard conductive material. This can be done advantageously by either of the processes known as electrical discharge machining or electrochemical machining. However, the complexity of the mechanism required to generate these curves as well as the complicated electrode shapes involved often negates the advantages.

Accordingly, novel apparatus are proposed for generating in a workpiece, curved surfaces of virtually any arcuate shape without requiring complex mechanisms or without resorting to complicated electrode shapes. Also, a unique cutting tool structure is proposed that is flexible and that has its deflection and its direction of deflection controlled so as to permit many curved configurations to be reproduced.

Figure 1:
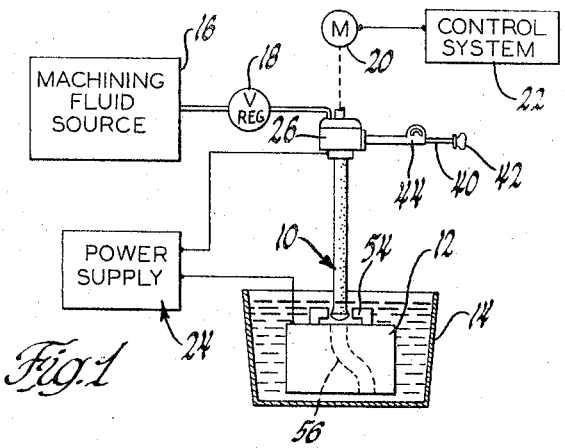
Figure 2:
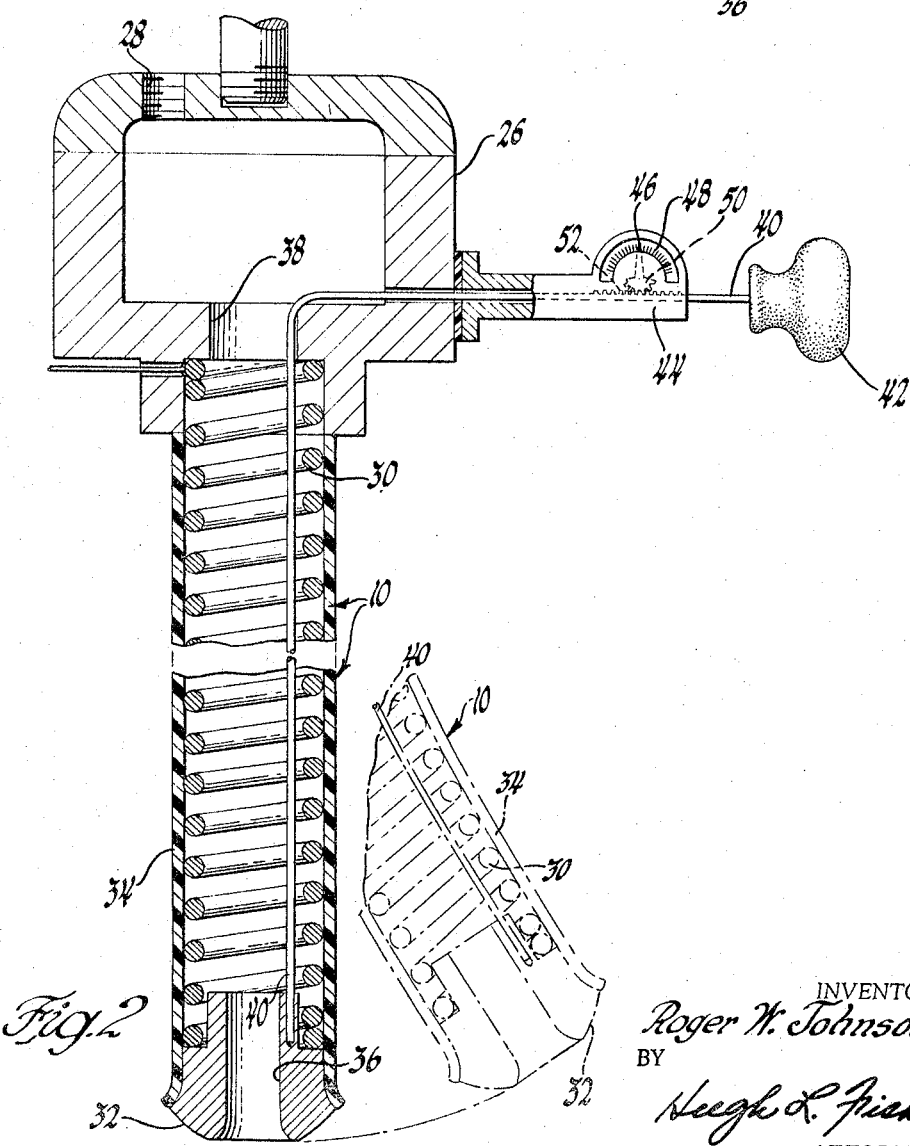

The foregoing and other objects and advantages of the invention will be apparent from the following description and from the accompanying drawings, in which:

FIGURE 1 is a schematic diagram of apparatus incorporating the principles of the invention; and FIGURE 2 is a detailed, large sectional view of the cutting tool displayed in FIGURE 1.

Referring now to the drawings in detail, the numerals 10 and 12 denote conductive electrodes that will hereinafter be referred to as respectively the cutting tool and the workpiece. The workpiece 12 is fixedly mounted to and insulated from a tank 14 containing the machining fluid. This machining fluid may, in a way to be further described, be supplied by a source 16 at a pressure established by a conventional pressure regulator 18. The cutting tool 10 is moved relative to the workpiece 12 by a feed motor 20 of any conventional type. The feed motor 20 is operated by a suitable control system 22 that functions to cause the feed motor 20 to perform in such a way that some optimum gap is always maintained between the cutting tool 10 and the workpiece 12. The electrical stock removing discharges across this gap are produced by an electrical power supply, denoted generally at 24, in a way well understood by those versed in the art.

It should be kept in mind that the electrical stock removing discharges can be generated either by the electrical discharge machining process or the electrochemical machining process. If it is proposed to use the latter process, the source of machining fluid 16 will provide a suitable electrolyte under pressure. The power supply 24, will deliver direct current to the gap such that current will flow through the electrolyte between the gap. This continuous discharge will cause stock to be electrochemically removed from the workpiece 12. The feed motor 20 and the control system 22 for carrying out the electrochemical process may be of the type disclosed in Patent No. 3,228,863 to Wanttaja et al., entitled "Electrolytic Process and Apparatus for Removing Stock From a Conductive Workpiece." On the other hand, if the electrical discharge machining process is to be employed, the machining fluid source 16 will supply a dielectric fluid and the power supply 24 will deliver a pulsating current to the gap. Intermittent discharges when gap voltage is proper will occur across the gap and cause stock to be eroded from the surface of the workpiece 12. For this electrical discharge machining process, the feed motor 20 and the control system 22 may be as disclosed in the patent to Colten et al. 3,059,150.

Considering now the details of the cutting tool 10 reference will first be made to FIGURE 2. As illustrated, the cutting tool 10 comprises a holder 26 preferably of an insulating type material that may be connected in any suitable fashion to the feed motor 20 and also by a passage 28 to the machining fluid source 16. These connections should be of a type that will permit the holder 26 to be rotated in a way to be explained. The bottom of the holder 26 has fixedly connected thereto a flexible conductor such as a coil spring 30. This coil spring 30 is electrically and fixedly connected to a machining end 32 at its lower part. The coil spring 30 is enclosed by a tubular and flexible insulator 34. The choice of material for the insulator 34 must keep in mind the possible corrosive tendencies of the chosen machining fluid.

The machining end 32 has a through opening 36 that in the relaxed position of the cutting tool 10 displayed in FIGURE 2 is coaxial with the axis of the coil spring 30 and a passage 38 in the holder 26. Hence, the machining fluid entering at the passage 28 will have a straight through path to the machining end 32.

The deflection of the cutting tool 10, e.g. to the FIGURE 2 broken line position, is accomplished by a tension cable assigned the numeral 40. This tension cable 40 at its lower end is connected to the machining end 32 at a distance offset from the machining end axis. The extent of the offset must be adequate to afford the necessary leverage for deflecting the tool 10 without excessive manual effort. As will be noted from FIGURE 2, the cable 40 extends upwardly and through the holder passage 38 and then to the outside of the holder 26 where its end has secured thereto a knob 42 that permits the cable 40 to be pulled or pushed as required. By pulling on the knob 42 the cable 40 will be under tension and deflect the cutting tool 10 rightwardly towards the FIGURE 2 broken line position.

If wanted, an indicator 44 may be employed to visually exhibit the extent of cutting tool deflection, in fact, by a proper calibration of the indicator 44, radii can be read directly. This visual indication can be accomplished by providing the indicator 44 with a pointer 46 that moves relative to a numbered dial 48. The pointer 46 can have associated therewith a gear-like element 50 that rotates the pointer 46 and is rotated itself by the engagement thereof with tooth-like projections 52 formed on the cable 40. With the indicator 44 suitably joined to the holder 26, the pulling-pushing movement of the knob 42 will rotate the pointer 46 a corresponding amount.

To start the cutting tool 10 operating, a suitable guide 54 viewed in FIGURE 1 may be needed to properly align the machining end 32 of the cutting tool 10 with the surface of the workpiece 12. Thereafter, the power supply 24 can be turned on and the feed motor 20 rendered operative so as to advance the cutting tool 10 towards the workpiece 12. It should be kept in mind that if preferred the workpiece 12 can be advanced toward the cutting tool 10. The source of machining fluid 16 is also rendered effective such that the stock removing discharges will commence as soon as the gap spacing is proper. If the surface or hole to be generated in the workpiece 12 is to have the broken line configuration shown in FIGURE 1, the cutting tool 10 will remain undeflected for its initial distance and then is deflected the needed angular amount to produce the radius at 56. As soon as the radius 56 is completed, the deflection can be altered to again achieve the straight portion. If the hole in the workpiece 12 is to be in the opposite direction, all that is required is that the holder 26 be rotated 180°. This can be done by merely manipulating the knob 42 since the indicator 44 is secured to the tool holder 26. Hence, using FIGURE 2 as an example, if the cutting tool 10 is deflected to the broken line position, rotation of the holder 26 180° will produce this broken line position on the opposite side.

If wanted, the workpiece 12 can be rotated along with the holder 26, or the workpiece 12 only rotated while generating the curved hole.

From the foregoing, it will be appreciated that with this novel apparatus it is easy to generate virtually any shape surface in a workpiece. The cutting tool only requires a flexible conductor and a tension member for deflecting the tool the needed angular amount. This structure is also well suited for permitting machining fluid to be delivered through the cutting tool to the machining or gap area.

The invention is to be limited only by the following claims.

What is claimed is:

1. A cutting tool electrode for electrically removing stock from the workpiece comprising an elongated flexible body having a conductive machining end thereon and extending predominantly in a one-direction position and means carried within the body and adjustable externally of the body for deflecting the body from the position a predetermined angular amount for generating a curved surface in the workpiece, the body being rotatable so as to establish the direction the body is deflected and also having a through passage therein for machining fluid.

2. A cutting tool electrode for electrically removing stock from a conductive workpiece comprising an elongated flexible conductor having a conductive machining end thereon and extending in a one-direction position, an insulator enclosing the conductor, and means within the insulator deflecting the conductor from the position so as to permit arcuate surfaces to be generated in the workpiece having a configuration corresponding to the shape of the flexible conductor.

3. A cutting tool electrode for electrically removing stock from a conductive piece comprising an elongated flexible body having a conductive machining end thereon and extending in a one-direction position, means carried within the body and adjustable externally of the body for deflecting the body from the position, the deflecting means including a tension cable so arranged relative to the flexible body as to bend the flexible body into predetermined arcuate shapes determined by the amount of tension on the cable thereby permitting corresponding shapes to be generated in the workpiece.

4. A cutting tool electrode for electrically removing stock from a conductive workpiece comprising an axially extending, elongated flexible body having a conductive machining end thereon, an insulator enclosing the body, means within the insulator for deflecting the body from the axially extending position, the deflecting means including a tension cable so arranged relative to the flexible body as to cause the flexible body to be deflected into a curved configuration for generating curved surfaces in the workpiece of a corresponding curved configuration, and means indicating the amount of deflection, the body being rotatable so as to establish the direction of the deflection.

5. A cutting tool electrode for electrically removing stock from a conductive workpiece comprising a rotatable and rectilinearly movable holder, a machining end, an elongated and flexible insulator, a conductive coil spring enclosed by the insulator and arranged to interconnect the machining end and the holder, the coil spring being so arranged as to serve as a conductor and also maintain the cutting tool electrode in a normal relatively straight relaxed position, a cable within the insulator having one end connected to the machining end at a point offset from the rotational axis thereof and the other end extending externally from the holder, the other end of the cable having a control member thereon for permitting tension of the cable to be manually altered and accordingly the extent of movement of the cutting tool electrode from the relaxed position, and indicating means associated with the cable for visually indicating the extent the cutting tool electrode is deflected from the relaxed position and accordingly the arc of a curve to be generated in the workpiece, the holder being rotatable so as to also revolve the machining end and thereby establish the direction of the curve, the holder, the flexible insulator and the machining end together affording a through passage for machining fluid.

6. In electrical stock removal apparatus, the combination of conductive cutting tool and workpiece electrodes spaced apart so as to form a machining gap therebetween, means supplying machining fluid to the gap, a source of electrical power connected across the gap so as to effect electrical stock removal discharges thereacross, means maneuvering the electrodes relative to each other, the cutting tool electrode having an elongated flexible body provided with a conductive machining end, and means carried within the body and adjustable externally of the body for deflecting the flexible body from a relaxed position a certain angular amount for generating a curved surface in the workpiece electrode.

7. In electrical stock removal apparatus; the combination of conductive cutting tool and workpiece electrodes spaced apart so as to form a machining gap therebetween; a source of electrical power connected across the gaps so as to produce electrical stock removing discharges thereacross; a source of machining fluid; means feeding the electrodes in gap closing and opening directions; the cutting tool electrode having an elongated flexible body provided with a conductive machining end and extending in a one-direction position; the cutting tool electrode being in communication with the source of machining fluid; and means carried within the body and adjustable externally of the body for deflecting the body from the position by a predetermined angular amount for generating a curved surface in the workpiece electrode; the body being revolvable so as to determine the direction of the curved surface and also affording a through passage for the machining fluid.

8. In electrical stock removal apparatus; the combination of conductive cutting tool and workpiece electrodes spaced apart so as to form a machining gap therebetween; means supplying machining fluid to the gaps; a source of electrical power connected across the gap so as to effect electrical stock removal discharges thereacross; means feeding the electrodes in gap closing and gap opening directions; the cutting tool electrode including an axially extending, flexible conductor connected to the electrical power source, the flexible conductor being provided with a conductive machining end and an insulator enclosing the conductor; and means within the insulator for deflecting the flexible conductor from the axially extending position a predetermined angular amount so as to generate a curved surface in the workpiece electrode as the electrodes are moved relative to each other in a gap closing direction.

9. In electrical stock removal apparatus; the combination of conductive cutting tool and workpiece electrodes spaced apart so as to form a machining gap therebetween; a source of electrical power connected across the gap so as to effect electrical stock removal discharges thereacross; a source of machining fluid; means feeding the electrodes relative to each other in gap closing and gap opening directions; the cutting tool electrode including a revolvable holder operatively connected to the feeding means and also communicating with the source of machining fluid, a machining end positioned adjacent the workpiece electrode, a conductive coil spring communicating with the source of electrical power and interconnecting the holder and the machining end so as to maintain the cutting tool electrode in a relatively straight relaxed position, an elongated and flexible tubular insulator surrounding the spring, and a cable within the insulator having one end connected to the machining end at a point offset from the rotational axis of the machining end and the other end extending externally of the holder and being provided with a control member, the control member being manually operable for altering the tension on the cable and accordingly the extent of deflection of the cutting tool electrode from the relaxed position so as to bend the cutting tool into a certain configuration for generating a corresponding curved configuration within the workpiece electrode, the cutting tool electrode being revolvable to establish the direction of the curved configuration; and means indicating the extent the cutting tool electrode is deflected from the relaxed position and therefore the arc of the curved configuration to be generated.

References Cited by the Examiner

UNITED STATES PATENTS

| | | | |
|---|---|---|---|
| 1,752,193 | 3/1930 | O'Hanlon | 239—588 |
| 1,822,240 | 9/1931 | Schade | 204—224 |
| 2,106,004 | 1/1938 | Inglee | 204—280 |
| 2,650,979 | 9/1953 | Tuebner | 219—15 |
| 2,902,584 | 9/1959 | Ullmann | 219—69 |
| 3,041,442 | 6/1962 | Ullmann | 219—69 |
| 3,223,610 | 12/1965 | Inoue | 204—224 |
| 3,247,087 | 4/1966 | Gauthier | 204—224 |

FOREIGN PATENTS 159,921　2/1933　Switzerland.

JOHN H. MACK, *Primary Examiner.*

R. K. MIHALEK, *Assistant Examiner.*